(12) United States Patent
Lima et al.

(10) Patent No.: US 7,764,600 B1
(45) Date of Patent: Jul. 27, 2010

(54) PROVIDING AN ALTERNATIVE SERVICE APPLICATION TO OBTAIN A COMMUNICATION SERVICE WHEN THE CURRENT SERVICE APPLICATION IS INHIBITED

(75) Inventors: Claudio R. Lima, San Jose, CA (US); Renxiang Huang, Sunnyvale, CA (US); James D. Black, San Francisco, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 169 days.

(21) Appl. No.: 12/053,785

(22) Filed: Mar. 24, 2008

(51) Int. Cl.
*G06F 11/00* (2006.01)

(52) U.S. Cl. ................ 370/217; 370/221; 370/235

(58) Field of Classification Search .......... 370/216, 370/217, 218, 219, 220, 221, 222, 225, 227, 370/228, 235, 237, 238, 252
See application file for complete search history.

(56) References Cited

U.S. PATENT DOCUMENTS 7,280,471 B2   10/2007   Rajagopal et al.
2003/0048750 A1*   3/2003   Kobayashi ............... 370/229
2003/0118011 A1*   6/2003   Wu et al. .................. 370/356
2007/0058561 A1   3/2007   Virgile
2007/0159977 A1*   7/2007   Dalal et al. ............... 370/238
2007/0177610 A1*   8/2007   Zuberi ................. 370/395.42
2007/0244750 A1   10/2007   Grannan et al.
2008/0081606 A1*   4/2008   Cole ......................... 455/424
2009/0034417 A1*   2/2009   Kondamuru et al. ...... 370/238
2009/0077195 A1*   3/2009   Gibbs et al. ............... 709/217

* cited by examiner

*Primary Examiner*—Chi H. Pham
*Assistant Examiner*—Kevin Mew

(57) ABSTRACT

A communication system receives packets transmitted by a user device. The packets implement a named service application to provide a communication service. The system transmits the packets to a packet network and identifies a communication problem. The system transmits information for delivery to the user device indicating that the named service application will be inhibited due to the communication problem and offering an alternative service application to provide the communication service. The system receives an acceptance transmitted by the user device, and in response, transmits the alternative service application for delivery to the user device. The system receives additional packets transmitted by the user device. The additional packets implement the alternative service application to provide the communication service. The system transmits the additional packets to the packet network.

17 Claims, 5 Drawing Sheets

US 7,764,600 B1

PROVIDING AN ALTERNATIVE SERVICE APPLICATION TO OBTAIN A COMMUNICATION SERVICE WHEN THE CURRENT SERVICE APPLICATION IS INHIBITED

TECHNICAL BACKGROUND

Deep packet inspection systems are being deployed to analyze communication packet streams and perform various operations. The deep packet inspection systems perform traffic shaping where packets in a given packet stream are restricted to a set bandwidth limit. The deep packet inspection systems also identify specific service applications being implemented by the packets. For example, deep packet inspection systems can identify specific Voice Over Internet Protocol (VOIP) service applications.

In some scenarios, the deep packet inspection systems inhibit specific service applications in response to network congestion. For example, packet networks use deep packet inspection systems to block a specific VOIP service application to relieve packet congestion and prevent network failure. Unfortunately, the users of the blocked VOIP service application must re-establish their current VOIP sessions and must re-authorize a new VOIP service.

OVERVIEW

A communication system receives packets transmitted by a user device. The packets implement a named service application to provide a communication service. The system transmits the packets to a packet network, and the system identifies a communication problem. The system transmits information for delivery to the user device indicating that the named service application will be inhibited due to the communication problem and offering an alternative service application to provide the communication service. The system receives an acceptance transmitted by the user device, and in response, transmits the alternative service application for delivery to the user device. The system receives additional packets transmitted by the user device. The additional packets implement the alternative service application to provide the communication service. The system transmits the additional packets to the packet network.

DETAILED DESCRIPTION

Figure 1:
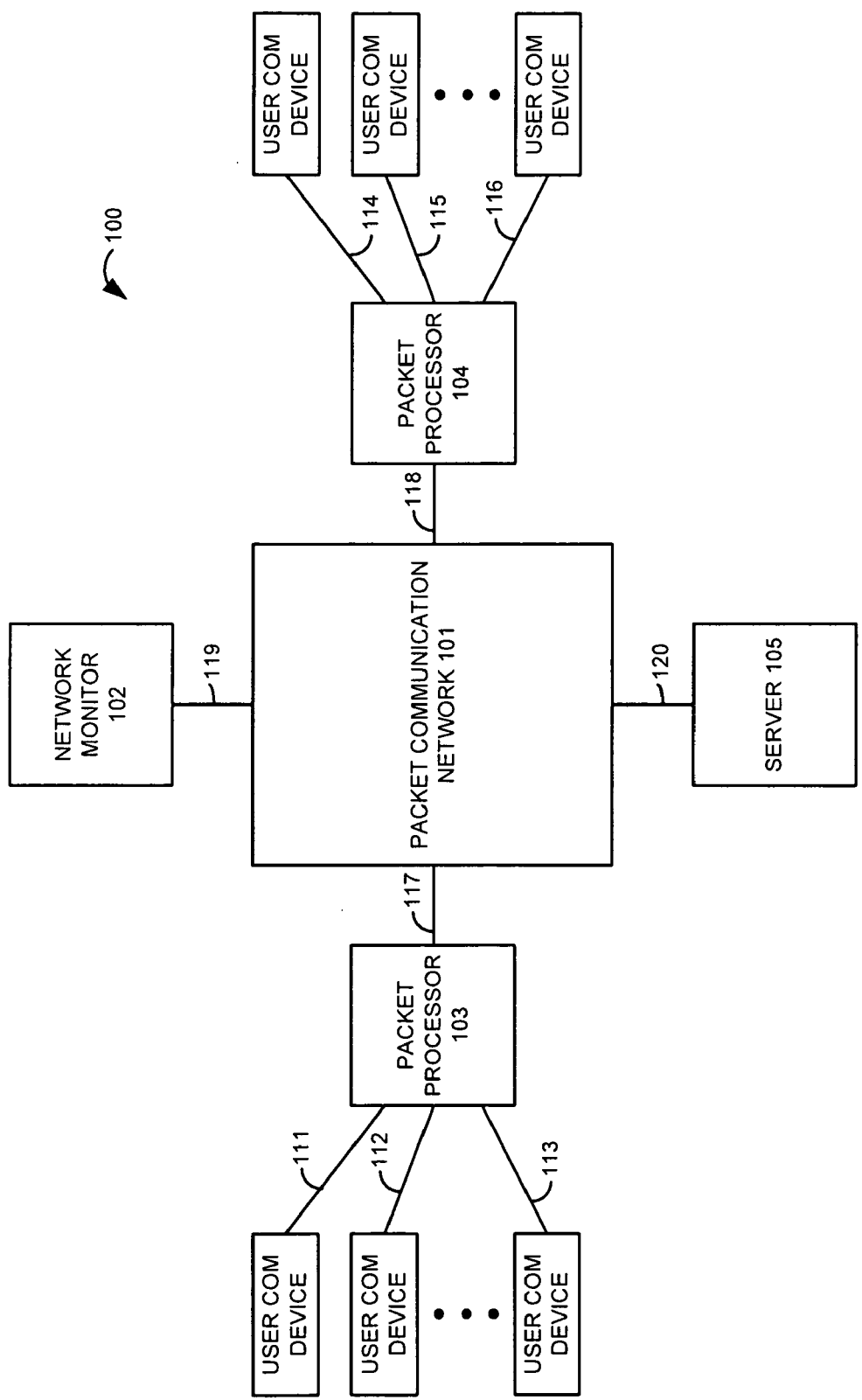
FIG. 1 is a block diagram that illustrates a communication system.

FIG. 1 is a block diagram that illustrates communication system 100. Communication system 100 comprises packet communication network 101, network monitor 102, packet processors 103-104, and server 105. Packet processor 103 and user communication devices communicate over communication links 111-113. Packet processor 103 and packet communication network 101 communicate over communication link 117. Packet processor 104 and other user communication devices communicate over communication links 114-116. Packet processor 104 and packet communication network 101 communicate over communication link 118. Network monitor 102 and packet communication network 101 communicate over communication link 119. Server 105 and packet communication network 101 communicate over communication link 120.

The user communication devices comprise telephones, transceivers, computers, digital assistants, Internet appliances, or some other packet communication apparatus. In some examples, at least some of the user communication devices are wireless communication devices. Packet communication network 101 comprises routers, gateways, servers, computer systems, communication links, or some other type of communication equipment—including combinations thereof. Network monitor 102 comprises a computer system that implements a packet network management system. Packet processors 103-104 comprise gateways, routers, deep packet inspection systems, or some other type of packet communication equipment—including combinations thereof. Server 105 comprises a computer system that provisions a packet communication service.

Communication links 111-120 may use various communication media, such as air, metal, optical fiber, or some other signal propagation path—including combinations thereof. Communication links 111-120 use various protocols, such as internet, telephony, optical networking, wireless communication, wireless fidelity, code division multiple access, worldwide interoperability for microwave access, or some other communication format—including combinations thereof. Communication links 111-120 could be direct links or they might include various intermediate components, systems, and networks.

Communication system 100 interacts with the user communication devices to provide various communication services. The communication services include voice, video, and audio services. To provide a particular communication service, an individual user communication device executes a named service application. The named service application comprises software that drives the user communication device to transmit packets to provide the particular communication service. Thus, the packets implement the named service application. The term "named" means that the service application has a specific name to differentiate the service application from other service applications that provide the same communication service. For example, Sprint provides a Sprint-named service application to wireless telephones to provide a mobile television communication service. Different entities may provide their own named service applications that provide the same communication service. For example, multiple companies provide different named Voice Over Internet Protocol (VOIP) service applications that each provide VOIP communication service.

Although monitor 102, processors 103-104, and server 105 are shown separately, these components may be integrated in various ways. For example, server 105 may be integrated in packet processors 103-104. Likewise, monitor 102 may be integrated in packet processors 103-104.

Figure 2:
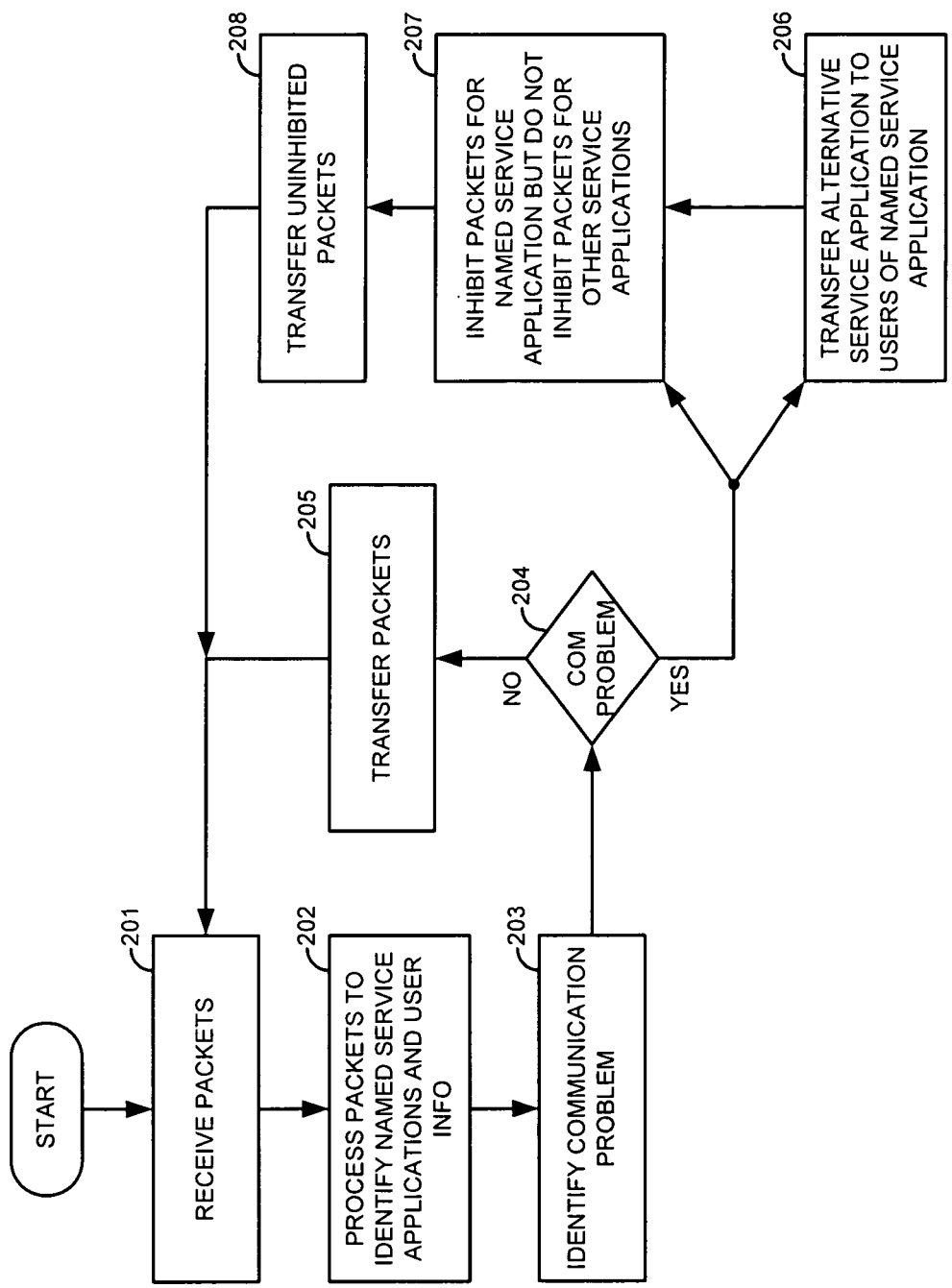
FIG. 2 is a flow diagram that illustrates the operation of the communication system.

FIG. 2 is a flow diagram that illustrates the operation of communication system 100. The reference numbers on FIG. 2 are illustrated parenthetically below. Packet processors 103-104 receive communication packets transmitted by the user devices (201). These communication packets implement various communication services using various named service applications. Packet processors 103-104 process the packets to identify the named service applications and user information (202). In some examples, this operation is part of a deep packet inspection that may include other operations, such as traffic shaping.

Network monitor 102 monitors packet communication network 101 to identify communication problems (203). Communication problems include congestion, latency, jitter, and lost packets, although there could be other problems. Alternatively, packet processors 103-104 may identify communication problems, such as a user communication device exceeding a communication usage threshold, such as a bandwidth limit. If no communication problems are detected (204), then packet processors 103-104 transfer the packets to packet communication network 101 (205).

If a communication problem is identified (204), then server 105 transfers an alternative service application to the user communication devices that were implementing the named (and inhibited) service application (206). Since the alternative service application is not inhibited by packet processors 103-104, the user communication devices may use the alternative service application to receive the communication service despite the network problem. To implement operation 206, packet processors 103-104 typically transfer user information to server 105. The user information indicates the user communication devices that are implementing the named service application that is being inhibited. Examples of user information include packet addresses, telephone numbers, device identifications, and user codes, although there could be others. Server 105 uses the user information to communicate with the appropriate user communication devices.

If a communication problem is identified (204), then packet processors 103-104 inhibit packets that implement the named service application, but packet processors 103-104 do not inhibit other packets that implement other service applications (207). Thus, packet processors 103-104 do not inhibit packets that implement the alternative service application. For example, in response to packet network congestion, packet processors 103-104 might inhibit packets that implement a free VOIP service application as identified by name, but packet processors 103-104 would not inhibit packets that implement an alternative paid VOIP service application. Inhibiting packets comprises blocking or delaying the packets—or blocking or delaying a portion of the packets in a packet stream.

Packet processors 103-104 transfer the uninhibited packets (208). Note that operations 206-207 are shown in a contemporaneous manner. Alternatively, operation 206 may precede operation 207, or operation 207 may precede operation 206. Likewise, operations 202 and 203 are shown sequentially, but these operations could occur simultaneously or have their order reversed.

Figure 3:
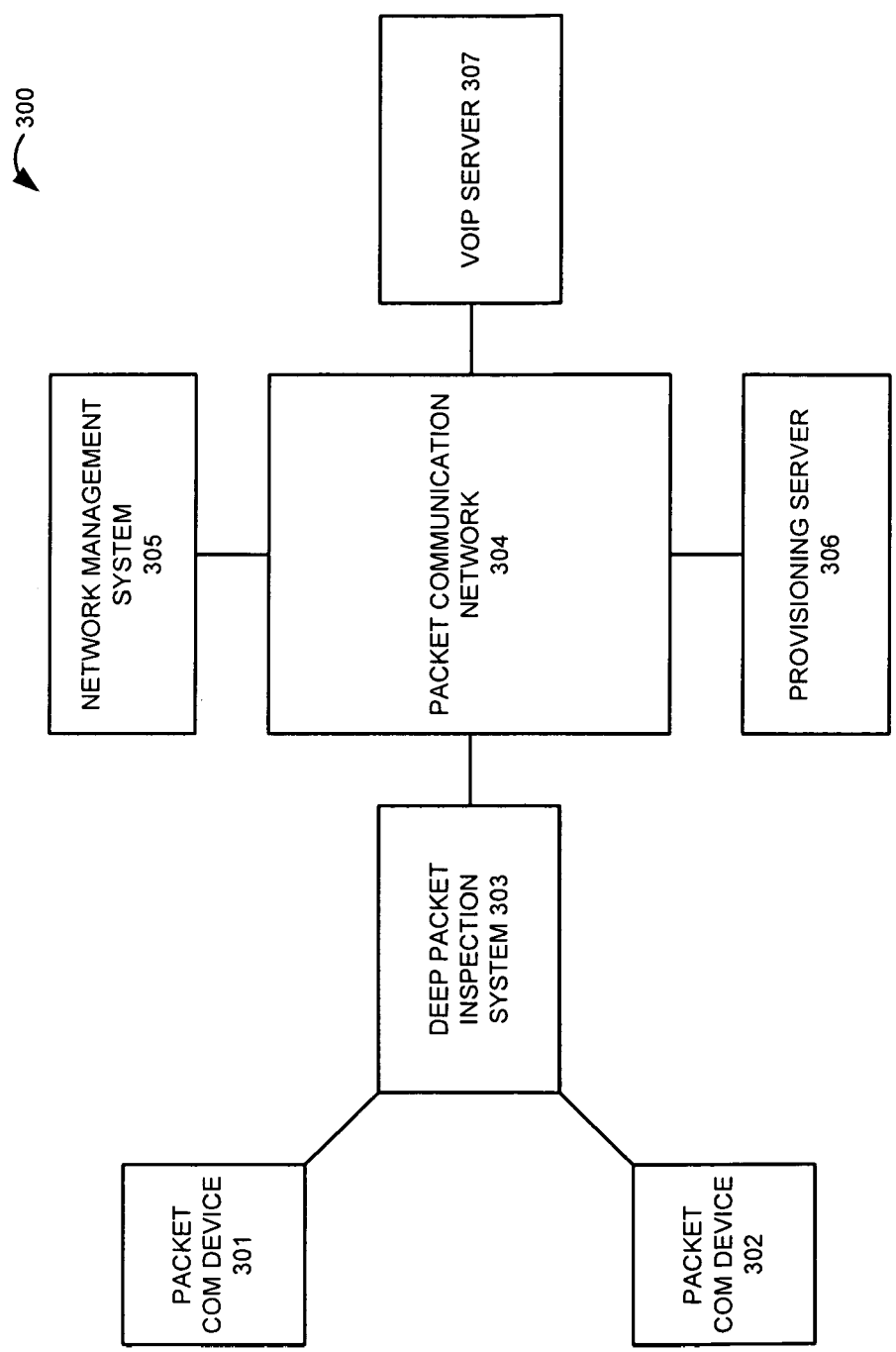
FIG. 3 is a block diagram that illustrates a VOIP communication system.

FIG. 3 is a block diagram that illustrates VOIP communication system 300. VOIP communication system 300 comprises packet communication devices 301-302, Deep Packet Inspection (DPI) system 303, packet communication network 304, network management system 305, provisioning server 306, and VOIP server 307. Note that the lines between blocks 301-307 could represent direct communication links or a combination of various communication links, systems, and networks.

Figure 4:
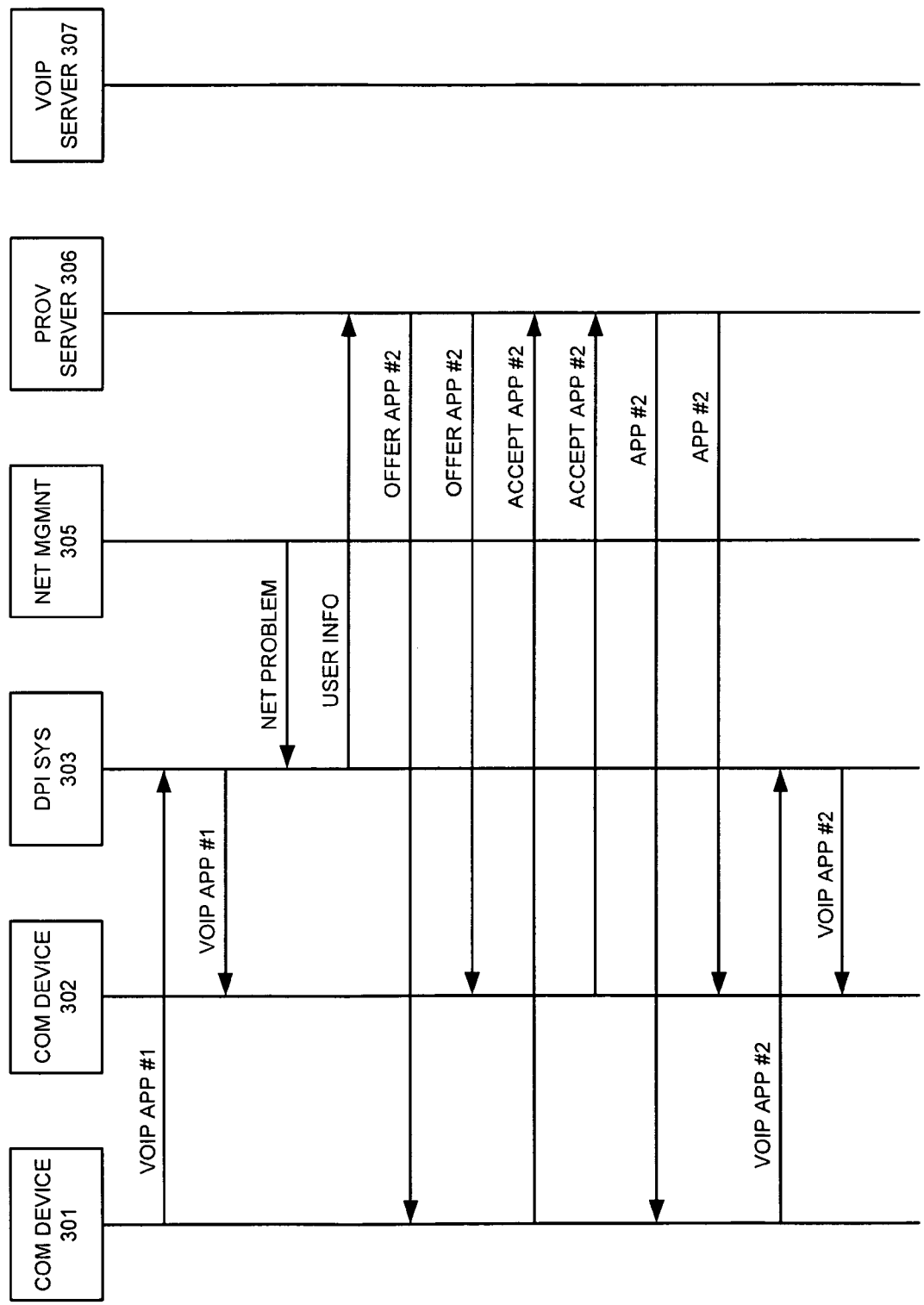
FIG. 4 is a sequence diagram that illustrates the operation of the VOIP communication system.
Figure 5:
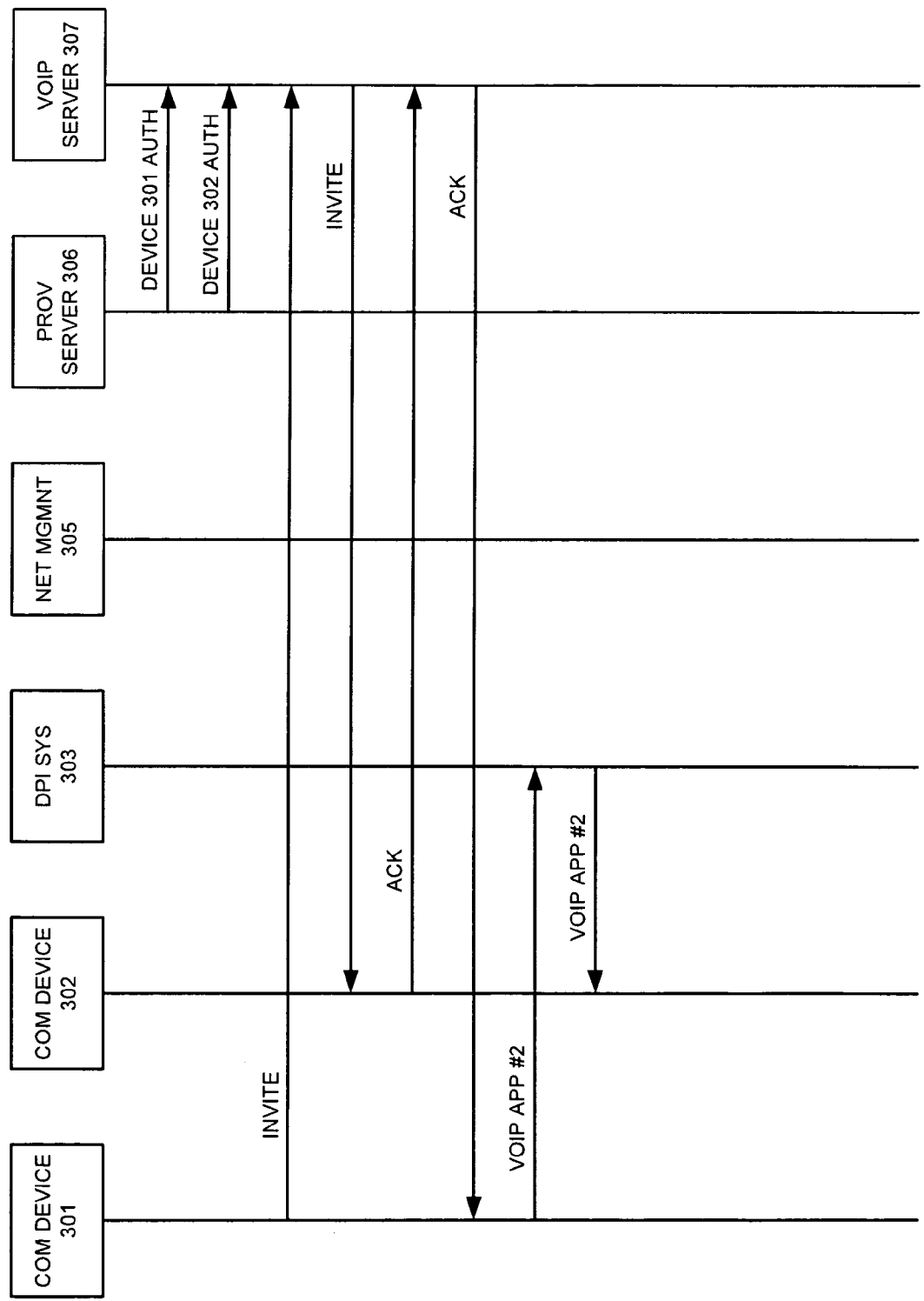
FIG. 5 is a sequence diagram that illustrates the operation of the VOIP communication system.

FIGS. 4-5 are sequence diagrams that illustrate the operation of VOIP communication system 300. For clarity, packet communication network 304 is largely omitted from the following description, although most communications will traverse packet network 304. Prior to the sequence, packet communication devices 301-302 have already implemented a first named service application to provide a VOIP communication service. Thus, the sequence begins with packet communication devices 301-302 already exchanging packets through DPI system 303 (and packet network 304). The packets implement the first named service application to provide the VOIP communication service.

Network management system 305 detects a problem such as network congestion and notifies DPI system 303. Alternatively, DPI system 303 may detect a problem, such as packet communication device 301 exceeding a bandwidth threshold. In response to the network problem, DPI system 303 will soon begin to inhibit packets that implement the first named service application. DPI system 303 transfers user information to provisioning server 306 indicating that packet communication devices 301-302 are using the first named service application. The user information also includes packet address and telephone number information used by packet communication devices 301-302 for the VOIP service.

In response to the user information, provisioning server 306 transfers information to packet communication devices 301-302 that indicates the first named service application will soon be inhibited due to network congestion. The information also offers an alternative second service application to provide VOIP service that will not be inhibited. Packet communication devices 301-302 receive and display the information to their users. At this point, the users may continue to communicate using the first named service application to agree on transitioning their VOIP session to the alternative second service application (not shown).

In this example, both users accept the offer and packet communication devices 301-302 transfer their acceptance to provisioning server 306. In response to the acceptance, provisioning server 306 transfers the alternative second service application and packet address information to packet communication devices 301-302. Packet communication devices 301-302 implement the alternative service application by exchanging packets with DPI system 303 (and packet network 304), and these packets are not inhibited. Since the packets use the packet address information provided by DPI system 303, communication devices 301-302 are able to flash over their VOIP session from the inhibited service application to non-inhibited service application without significant additional call set-up.

In response to the user acceptance, provisioning server 306 also transfers authorizations for user communication devices 301-302 to VOIP server 307. The authorizations include the packet addresses and telephone numbers for communication devices 301-302. Subsequently, communication device 301 transfers an invite message to VOIP server 307 for communication device 302. In response to the authorization, VOIP server 307 forwards the invite message to communication device 302. Communication device 302 returns an acknowledgement message to VOIP server 307, and VOIP server 307 forwards the acknowledgement message to communication device 301. Communication devices 301-302 then use the alternative second service application to exchange packets through DPI system 303 (and packet network 304) to obtain VOIP communication service. Communication device 302 could initiate VOIP calls in a similar manner since it has been authorized.

By accepting the offer, communication devices 301-302 were able to flash over their current VOIP session without significant additional call set-up. In addition, communication devices 301-302 were able to initiate additional sessions in the future with additional significant authorization. Thus, communication system 300 allows users to easily obtain a communication service even if their current service application that provides the communication service is inhibited.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the named embodiments described above, but only by the following claims and their equivalents.

What is claimed is:

1. A method of operating a communication system, the method comprising:
    receiving packets transmitted by a user device wherein the packets have a packet address and implement a named service application to provide a communication service;
    transmitting the packets to a packet network;
    identifying a communication problem;
    transmitting information for delivery to the user device indicating that the named service application will be inhibited due to the communication problem and offering an alternative service application to provide the communication service along with the packet address for delivery to the user device;
    receiving an acceptance transmitted by the user device, and in response, transmitting the alternative service application for delivery to the user device;
    receiving additional packets transmitted by the user device wherein the additional packets include the packet address and implement the alternative service application to provide the communication service; and
    transmitting the additional packets to the packet network.

2. The method of claim 1 further comprising transmitting an authorization for the user device for delivery to a server for the alternative service application.

3. The method of claim 1 wherein communication problem comprises congestion in the packet network.

4. The method of claim 1 wherein communication problem comprises the user device exceeding a communication usage threshold.

5. The method of claim 1 wherein the communication service comprises a voice over internet protocol service.

6. A method of operating a communication system, the method comprising:
    receiving first packets transmitted by a user device wherein the first packets implement a named service application to provide a communication service;
    transmitting the first packets to a packet network;
    identifying a communication problem;
    receiving second packets transmitted by the user device wherein the second packets have a packet address and implement the named service application to provide the communication service;
    in response to the communication problem, inhibiting the second packets and transmitting an alternative service application and with the packet address for delivery to the user device;
    receiving third packets transmitted by the user device wherein the third packets use the packet address and implement the alternative service application to provide the communication service; and
    transmitting the third packets to the packet network.

7. The method of claim 6 further comprising transmitting an authorization for the user device for delivery to a server for the alternative service application.

8. The method of claim 6 wherein communication problem comprises congestion in the packet network.

9. The method of claim 6 wherein communication problem comprises the user device exceeding a communication usage threshold.

10. The communication system of claim 6 wherein inhibiting the second packets that implement the named service application comprises performing deep packet inspection.

11. The method of claim 6 wherein the communication service comprises a voice over internet protocol service.

12. A method of operating a communication system, the method comprising:
    receiving packets transmitted by a user device wherein the packets have a destination internet protocol address and implement a named service application to provide a Voice Over Internet Protocol (VOIP) service;
    transmitting the packets to a packet network;
    identifying a communication problem;
    transferring information for delivery to the user device indicating that the named service application will be inhibited due to the communication problem and offering an alternative service application to provide the VOIP service;
    receiving an acceptance transmitted by the user device, and in response, transmitting the alternative service application and the destination internet protocol address for delivery to the user device and transmitting an authorization for the user device for delivery to a VOIP server for the alternative service application;
    receiving additional packets transmitted by the user device wherein the additional packets include the destination internet protocol address and implement the alternative service application to provide the VOIP service; and
    transmitting the additional packets to the packet network.

13. The method of claim 12 wherein communication problem comprises congestion in the packet network.

14. The method of claim 12 wherein communication problem comprises the user device exceeding a communication usage threshold.

15. The method of claim 12 wherein the user device comprises a wireless communication device.

16. The method of claim 12 wherein receiving the packets and the additional packets comprises receiving the packets and the additional packets into a deep packet inspection system.

17. The method of claim 12 wherein the named service application is inhibited by a deep packet inspection system.

* * * * *